United States Patent
Gupta et al.

(10) Patent No.: US 11,163,697 B2
(45) Date of Patent: Nov. 2, 2021

(54) USING A MEMORY SUBSYSTEM FOR STORAGE OF MODIFIED TRACKS FROM A CACHE

(71) Applicant: International Business Machines Corporation, Armonk, NY (US)

(72) Inventors: Lokesh Mohan Gupta, Tucson, AZ (US); Matthew G. Borlick, Tucson, AZ (US); Kevin J. Ash, Tucson, AZ (US); Kyler A. Anderson, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/746,473

(22) Filed: Jan. 17, 2020

(65) Prior Publication Data

US 2021/0224197 A1  Jul. 22, 2021

(51) Int. Cl.

| | |
|---|---|
| *G06F 12/00* | (2006.01) |
| *G06F 13/00* | (2006.01) |
| *G06F 13/28* | (2006.01) |
| *G06F 12/121* | (2016.01) |
| *G06F 12/0817* | (2016.01) |
| *G06F 9/50* | (2006.01) |

(52) U.S. Cl.
CPC .......... *G06F 12/121* (2013.01); *G06F 9/5016* (2013.01); *G06F 12/0817* (2013.01); *G06F 2212/1021* (2013.01); *G06F 2212/608* (2013.01)

(58) Field of Classification Search
CPC .. G06F 9/5016; G06F 12/0815; G06F 12/121; G06F 2212/608

USPC .......................................................... 711/133
See application file for complete search history.

(56) References Cited

U.S. PATENT DOCUMENTS

| | | | |
|---|---|---|---|
| 2006/0007758 A1* | 1/2006 | Lee .......................... | G11C 7/22 365/193 |
| 2006/0212654 A1* | 9/2006 | Balakrishnan ...... | G06F 12/0875 711/125 |
| 2009/0164733 A1* | 6/2009 | Kim ..................... | G06F 12/0811 711/133 |
| 2012/0011326 A1* | 1/2012 | Higashijima ....... | G06F 12/0804 711/142 |
| 2015/0058552 A1 | 2/2015 | Hamedani et al. | |
| 2015/0161055 A1* | 6/2015 | Deguillard .............. | G06F 9/455 711/6 |

(Continued)

*Primary Examiner* — Charles Rones
*Assistant Examiner* — Sidney Li
(74) *Attorney, Agent, or Firm* — Konrad Raynes Davda & Victor LLP; Janaki K. Davda (57) ABSTRACT

Provided are techniques for using a memory subsystem for a workload job. A section of a memory subsystem is allocated to a workload job, where the memory subsystem is comprised of a plurality of heterogeneous memory devices. In response to a track being modified for the workload job in a cache, it is determined that modified tracks have reached a threshold portion of the cache. In response to determining that the track exists in the section of the memory subsystem, data in the track in the section of the memory subsystem is overwritten with data in the track in the cache. in response to determining that the track does not exist in the section of the memory subsystem, the data in the track in the cache is copied to the track in the section of the memory subsystem, and the track is demoted from the cache.

18 Claims, 10 Drawing Sheets

(56) References Cited

U.S. PATENT DOCUMENTS

| | | |
|---|---|---|
| 2016/0055191 A1 | 2/2016 | Joshi et al. |
| 2017/0052898 A1 | 2/2017 | Ash et al. |
| 2017/0091089 A1* | 3/2017 | Brizio .................. G06F 12/084 |
| 2017/0109295 A1 | 4/2017 | Lasperas et al. |

* cited by examiner

USING A MEMORY SUBSYSTEM FOR STORAGE OF MODIFIED TRACKS FROM A CACHE

BACKGROUND

1. Field of the Invention

The present invention relates to a computer program product, computer system, and computer-implemented method for using a memory subsystem for a workload job, such as a sort job. The memory subsystem may be comprised of a plurality of heterogeneous memory devices.

2. Description of the Related Art

A storage class memory (SCM) system utilizes low latency Dynamic Random Access Memory (DRAM) and one or more higher latency memory devices (e.g., flash NAND), which are less expensive than DRAM, to provide greater storage in the memory or cache at a lower cost by using higher latency, lower cost NAND devices. SCM allows system memory to be expanded with fast access non-volatile memory NAND devices.

Flash memory devices have less endurance than DRAM as there are a limited number of erase cycles for flash bit cells, far less so than for DRAM cells. One technique in the prior art to reduce wear on the flash memory devices is to use wear leveling techniques that distribute writes across multiple flash memory cells in the same or different device to avoid overuse of specific flash memory cells.

Sort jobs are a type of workload job. Currently, cache has Cache Fast Write (CFW) for sort jobs.

Sort jobs have the following characteristics: sequential writes followed by reads; data is temporary (i.e., CFW data is discarded by the host once the workload job is complete); and data loss is acceptable since any sort job that does not complete is re-started.

In particular, the sort data is temporary data that is useful until the sort is complete. After the sort is complete, that sort data may be discarded. In addition, the host submits the sort job with an initial CFW Identifier (ID). If there is data loss after the sort job is started, then the CFW Identifier (ID) is incremented. The host receives an error for the sort job because the incremented CFW ID does not match the initial CFW ID. In response to receiving the error, the host re-starts the sort job with a new CFW ID.

Currently, with CFW for sort jobs, the conventional system does not make a Non-Volatile Storage (NVS) copy on write, but, instead, just writes into cache. If the cache becomes full with modified CFW tracks, then the conventional system destages tracks onto drives. Also, CFW tracks are discarded when a host issues a discard command. In addition, there is an identifier associated with each sort job. When data is lost on failover, the identifier is incremented, and the host re-starts the sort job for moving a Logical Storage Sub-system (LSS), which is owned by the failed cluster.

SUMMARY

In accordance with certain embodiments, a computer-implemented method is provided for using a memory subsystem for a workload job. The computer-implemented method comprises operations. A section of a memory subsystem is allocated to a workload job, where the memory subsystem is comprised of a plurality of heterogeneous memory devices. In response to a track being modified for the workload job in a cache, it is determined that modified tracks have reached a threshold portion of the cache. In response to determining that the track exists in the section of the memory subsystem, data in the track in the section of the memory subsystem is overwritten with data in the track in the cache. In response to determining that the track does not exist in the section of the memory subsystem, the data in the track in the cache is copied to the track in the section of the memory subsystem, and the track is demoted from the cache.

In accordance with other embodiments, a computer program product is provided for using a memory subsystem for a workload job. The computer program product comprises a computer readable storage medium having program code embodied therewith, the program code executable by at least one processor to perform operations. A section of a memory subsystem is allocated to a workload job, where the memory subsystem is comprised of a plurality of heterogeneous memory devices. In response to a track being modified for the workload job in a cache, it is determined that modified tracks have reached a threshold portion of the cache. In response to determining that the track exists in the section of the memory subsystem, data in the track in the section of the memory subsystem is overwritten with data in the track in the cache. In response to determining that the track does not exist in the section of the memory subsystem, the data in the track in the cache is copied to the track in the section of the memory subsystem, and the track is demoted from the cache.

In accordance with yet other embodiments, a computer system is provided for using a memory subsystem for a workload job. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A section of a memory subsystem is allocated to a workload job, where the memory subsystem is comprised of a plurality of heterogeneous memory devices. In response to a track being modified for the workload job in a cache, it is determined that modified tracks have reached a threshold portion of the cache. In response to determining that the track exists in the section of the memory subsystem, data in the track in the section of the memory subsystem is overwritten with data in the track in the cache. In response to determining that the track does not exist in the section of the memory subsystem, the data in the track in the cache is copied to the track in the section of the memory subsystem, and the track is demoted from the cache.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Initially, a host issues a workload job with a host job identifier. In certain embodiments, a section of a memory subsystem (i.e., SCM) is allocated for the workload job (e.g., to store CFW data or other data for a sort job). When modified data for a track fills a cache beyond a threshold (e.g., a DRAM cache), instead of destaging the data for the track from the cache to storage (e.g., disk drives), the data for the track is copied from the cache to a section of the memory subsystem. When a track is demoted from the cache, data from that track is copied from the cache to the section of the memory subsystem. On a miss in the cache (i.e., data for the workload job is not found in the cache), if data is in the section of the memory subsystem, then the data is copied to the cache from the section of the memory subsystem, otherwise, data is staged from storage. If the host job identifier is incremented or when the host is done with one or more workload jobs, then the section of the memory subsystem for each of the one or more workload jobs is trimmed, which releases the space in that section of the memory subsystem. In particular, the trim releases space from a starting address to an ending address of the section.

Figure 1:
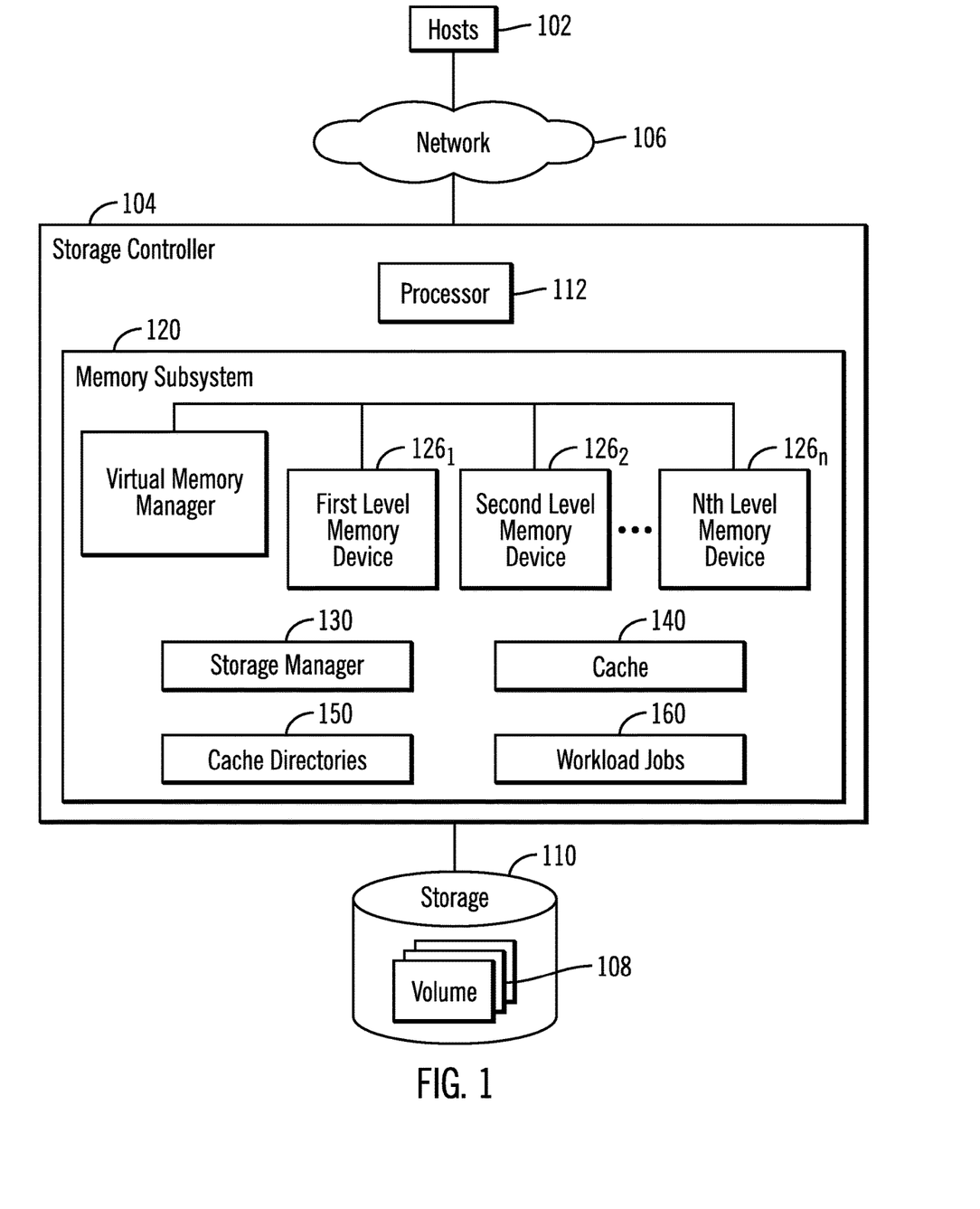
FIG. 1 illustrates, in a block diagram, a computing environment in accordance with certain embodiments.

The host 102 provides an initial host job identifier for a workload job. In certain embodiments, the host job identifier is a CFW ID. The host 102 updates the host job identifier when re-starting a workload job that did not complete or when starting another workload job.

In certain embodiments, the host job identifier is incremented by the storage manager 130 when data is lost. For example, in a failover scenario, the cluster executing the workload becomes unavailable and the data is lost. In this scenario, there is not another copy of the data (e.g., an NVS copy), and the storage manager 130 increments the host job identifier. When the host reads the data from the storage controller 104, the host 102 sees a mismatch in the initial host job identifier and the new host job identifier and re-starts the workload job from start. That is, when the workload job is interrupted, the host does not use any of the data from the previous workload job, and the workload job is restarted and sequentially rewrites the data.

With embodiments, a workload job may be a sort job, a merge job or a join job. In certain embodiments, the workload job may be any job that has the following characteristics: sequential writes followed by reads; the data is temporary (e.g., the data may be discarded by the host once the workload job is complete); and data loss is acceptable since a workload job that does not complete may be re-started. In certain embodiments, the workload job is one where data is written infrequently and sequentially, where the data is read many times, and where the data may be thrown out when the workload job is re-started. For example, such workload jobs may be merge jobs or join jobs.

FIG. 1 illustrates, in a block diagram, a computing environment in accordance with certain embodiments. A plurality of hosts 102 may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory subsystem 120, such as a Storage Class Memory (SCM) system, having a virtual memory manager 124 to manage the placement of tracks of data in one of a plurality of memory devices, such as a first level memory device $126_1$, a second level memory device $126_2$, through an nth level memory device $126_n$. The virtual memory manager 124 may maintain address translation tables to provide translation services and map tracks in the volumes 108 to physical or logical locations in the memory devices $126_1 \ldots 126_n$. The virtual memory manager 124 may further include algorithms to perform wear leveling to distribute write operations to different memory devices $126_1 \ldots 126_n$, and different locations within the memory devices, such as solid state storage devices (SSDs) or flash memory, that have a limited number of erase cycles to increase the life span of these lower level memory devices $126_1 \ldots 126_n$. In certain embodiments, the memory subsystem 120 comprising the virtual memory manager 124 and level memory devices $126_1 \ldots 126_n$ may function as another cache for the storage controller 104 or other computing device.

The storage controller 104 also includes a storage manager 130, a cache 140 (e.g., a DRAM cache), cache directories 150, and workload jobs 160. The storage manager 130 may move tracks between the cache 140 and the memory subsystem 120 or between the cache 140 and the storage 110. In certain embodiments, the storage manager 130 works with the virtual memory manager 124 to move tracks between the cache 140 and the memory subsystem 120, with the virtual memory manager 120 determining which storage device $126_1 \ldots 126_n$ is to store data for the track.

The processor 112, the virtual memory manager 124, the memory devices $126_1 \ldots 126_n$, the storage manager 130, the cache, the cache directories 150, and the workload jobs 160 may communicate over one or more bus interfaces. Further, the virtual memory manager 124 may communicate over different types and separate bus and device interfaces for different of the memory devices $126_1 \ldots 126_n$. For instance, a local memory interface may be used to communicate with the first level memory device $126_1$, such as for a DRAM, and a storage device interface may be used to communicate with the lower level memory devices $126_2 \ldots 126_n$, such as Non-Volatile Memory Express (NVME) to communicate with flash memory and SSDs.

In certain embodiments, the first level memory device $126_1$ may comprise a high cost and very low latency device such as a Dynamic Random Access Memory (DRAM) or Static Random Access Memory (SRAM), and the lower level memory devices $126_2 \ldots 126_n$ may comprise less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In certain embodiments, the lower level memory devices $126_2 \ldots 126_n$ may have different endurance profiles with different number of available erase cycles, such that higher level of the memory devices $126_2 \ldots 126_n$ allow for a greater number of erase cycles, i.e., greater endurance, than the lower level of the memory devices $126_2 \ldots 126_n$. For instance, lower level memory device $126_i$ may have a greater endurance, i.e., higher number of erase cycles, than lower level memory device $126_j$, where i<j. There may be one or more lower level memory devices $126k$.

The virtual memory manager 124 may comprise a separate processing or hardware device implemented as microcode or firmware in hardware devices in the storage controller 104, such as in Application Specific Integrated Circuits (ASICs). Alternatively, the virtual memory manager 124 may comprise a system having a processor executing code loaded into a memory device. Still further, the virtual memory manager 124 may be implemented as code loaded into the first level memory device $126_1$ and executed by the processor 112.

The storage 110 may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 106 may comprise a Storage Area Network (SAN), a Local Area Network (LAN), a Wide Area Network (WAN), the Internet, and Intranet, etc. Alternatively, the hosts 102 may connect to the storage controller 104 over a bus interface, such as a Peripheral Component Interconnect (PCI) bus interface and other interfaces known in the art.

Figure 2:
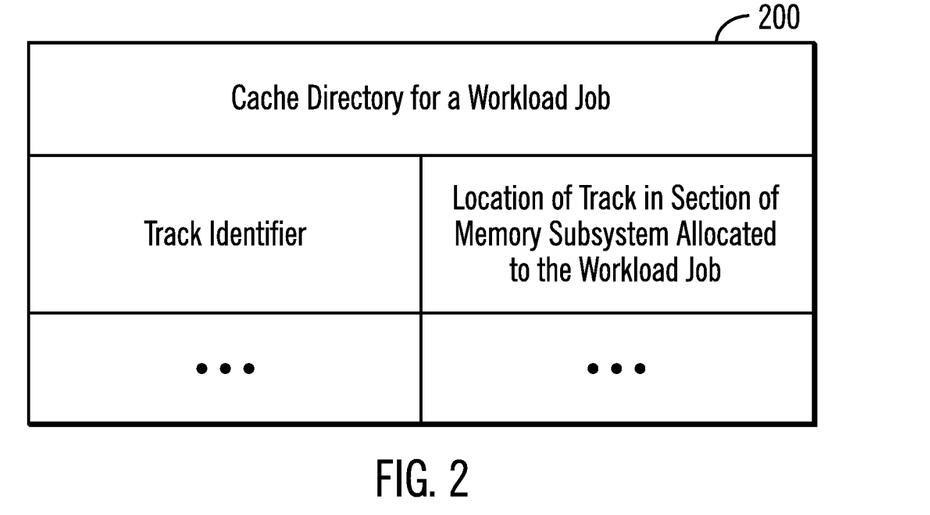
FIG. 2 illustrates an example cache directory for a workload job in accordance with certain embodiments.

FIG. 2 illustrates an example cache directory for a workload job 200 ("cache directory") in accordance with certain embodiments. In this example, the cache directory for a workload job 200 includes a track identifier and the location of that track in the section of the memory subsystem 120 that is allocated to the workload job. In certain embodiments, each track has a track identifier, and the host 102 submits requests to read or write a track by providing the track identifier.

In certain embodiments, there is a cache directory for each section of the memory subsystem 120 that is allocated to a workload job. In certain embodiments, the cache directory is a hash table. The cache directory may be used to efficiently determine whether a particular track is in the section of the memory subsystem 120.

Figure 3:
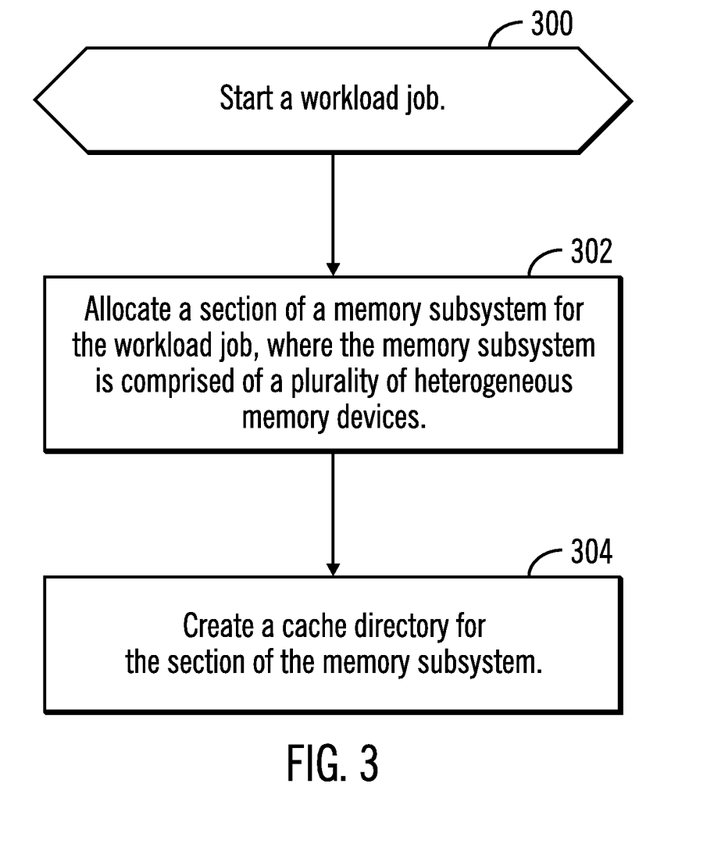
FIG. 3 illustrates, in a flowchart, operations performed in accordance with certain embodiments.

FIG. 3 illustrates, in a flowchart, operations performed in accordance with certain embodiments. Control begins at block 300 with the storage manager 130 starting a workload job (e.g., a sort job). In certain embodiments, the storage manager 130 starts the workload job in response to receiving a request to do so from a host 102. In block 302, the storage manager 130 allocates a section of the memory subsystem 120 for the workload job, where the memory subsystem 120 is comprised of a plurality of heterogeneous memory devices. This section of the memory subsystem 120 may be expanded if more space is needed. In block 304, the storage manager 130 creates a cache directory for the section of the memory subsystem 120.

Thus, with embodiments, a section of the memory subsystem 120 is allocated for a workload job when that workload job first starts, and this section may be expanded. In addition, a cache directory is created for the section of memory subsystem 120. In certain embodiments, the cache directory is a hash table that is used to determine whether a particular track exists in the section of memory subsystem 120.

Figure 4A:
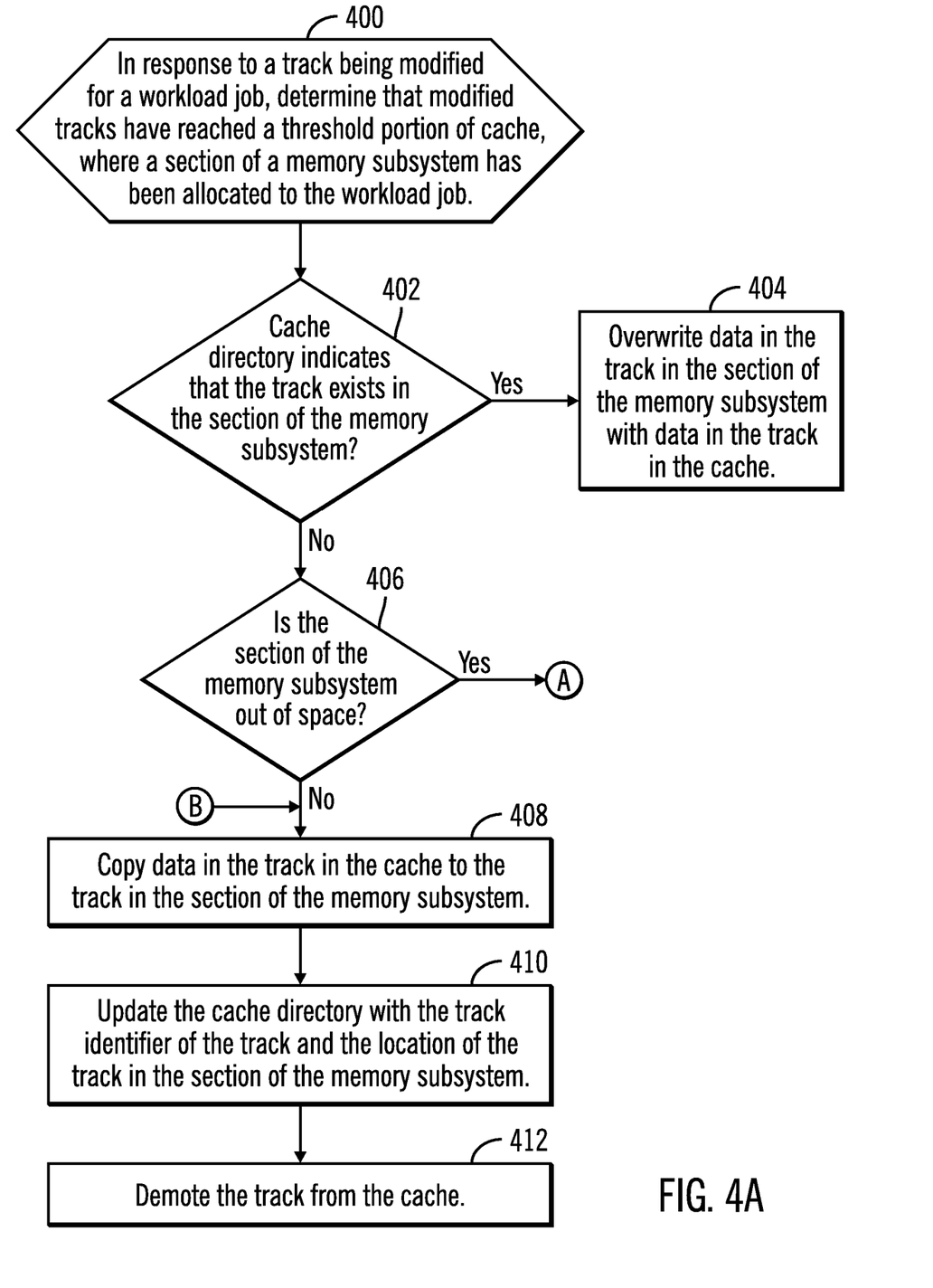
FIGS. 4A and 4B illustrate, in a flowchart, operations when a cache is becoming full in accordance with certain embodiments.
Figure 4B:
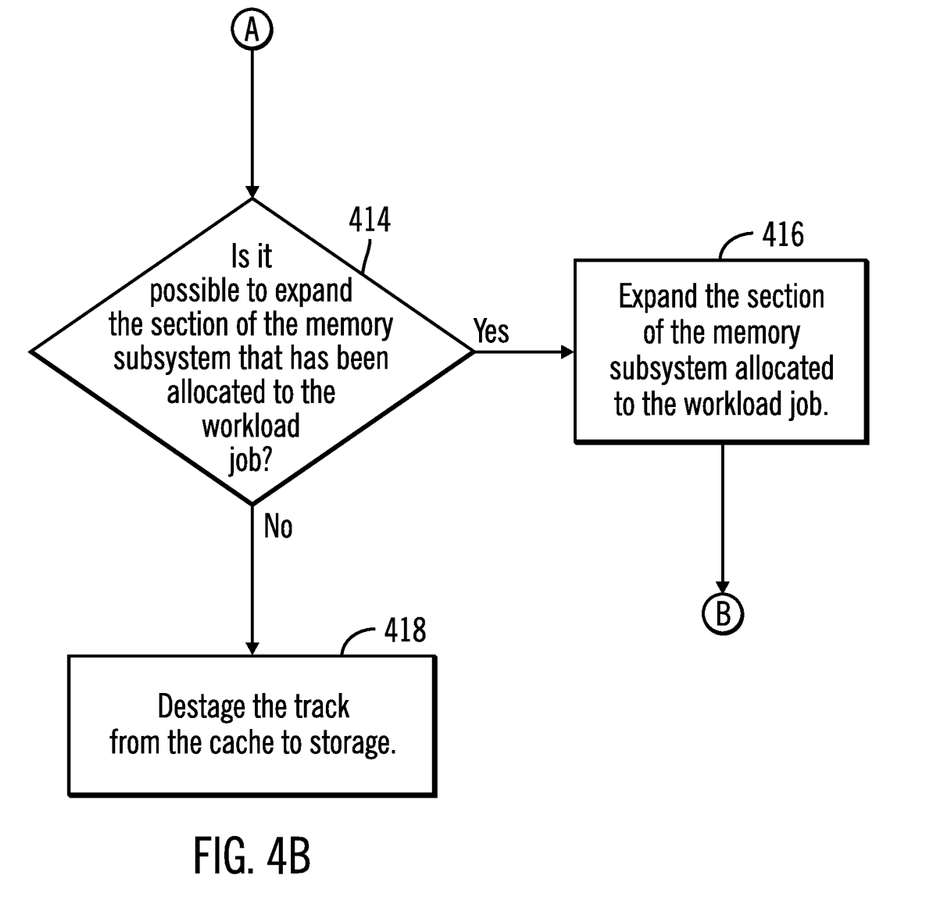

FIGS. 4A and 4B illustrate, in a flowchart, operations when the cache is becoming full in accordance with certain embodiments. Control begins at block 400, in response to a track being modified for a workload job, with the storage manager 130 determining that modified tracks have reached a threshold portion of the cache 140, where a section of the memory subsystem 120 has been allocated to the workload job. The threshold may be described as a capacity threshold (e.g., 80% of the cache is full). In block 402, the storage manager 130 determines whether the cache directory indicates that the track exists in the section of the memory subsystem 120. If so, processing continues to block 404, otherwise, processing continues to block 406.

In block 404, the storage manager 130 overwrites data in the track in the section of the memory subsystem 120 with data in the track in the cache 140.

In block 406, the storage manager 130 determines whether the section of the memory subsystem 120 is out of space. If so, processing continues to block 414 (FIG. 4B), otherwise, processing continues to block 408.

In block 408, the storage manager 130 copies data in the track in the cache 140 to the track in the section of the memory subsystem 120. The track in the cache 140 corresponds to the track in the section of the memory subsystem 120. In block 410, the storage manager 130 updates the cache directory with the track identifier of the track and the location of the track in the section of the memory subsystem 120. In block 412, the storage manager 130 demotes the track from the cache 140. Demoting the track from the cache 140 may be described as making space in the cache 140 as another track may be written in that space.

In block 414, the storage manager 130 determines whether it is possible to expand the section of the memory subsystem 120 that has been allocated to the workload job. If so, processing continues to block 416, otherwise, processing continues to block 418.

In block 416, the storage manager 130 expands the section of the memory subsystem 120 allocated to the workload job. From block 416 (FIG. 4B), processing continues to block 408 (FIG. 4A).

In block 418, the storage manager 130 destages the track from the cache 140 to storage 110.

When modified tracks (e.g., CFW tracks) reach a threshold (e.g., 80% of cache), then conventional systems destage the modified tracks to the storage 110 (e.g., disk drives). With embodiments, when modified tracks reach a threshold (e.g., 80% of cache), if the track exists in the section of the memory subsystem 120, then the track is overwritten with a new image from the cache 140. If the section of the memory subsystem 120 is out of space, then the section is expanded, if possible. If the section is out of space and cannot be expanded, then the track is destaged to the storage 110. Otherwise, if there is space in the section of the memory subsystem 120 to store another track, then the modified track is copied to the section of the memory subsystem 120, the cache directory is updated for the section of the memory subsystem 120, and the track is demoted from the cache 140.

Figure 5A:
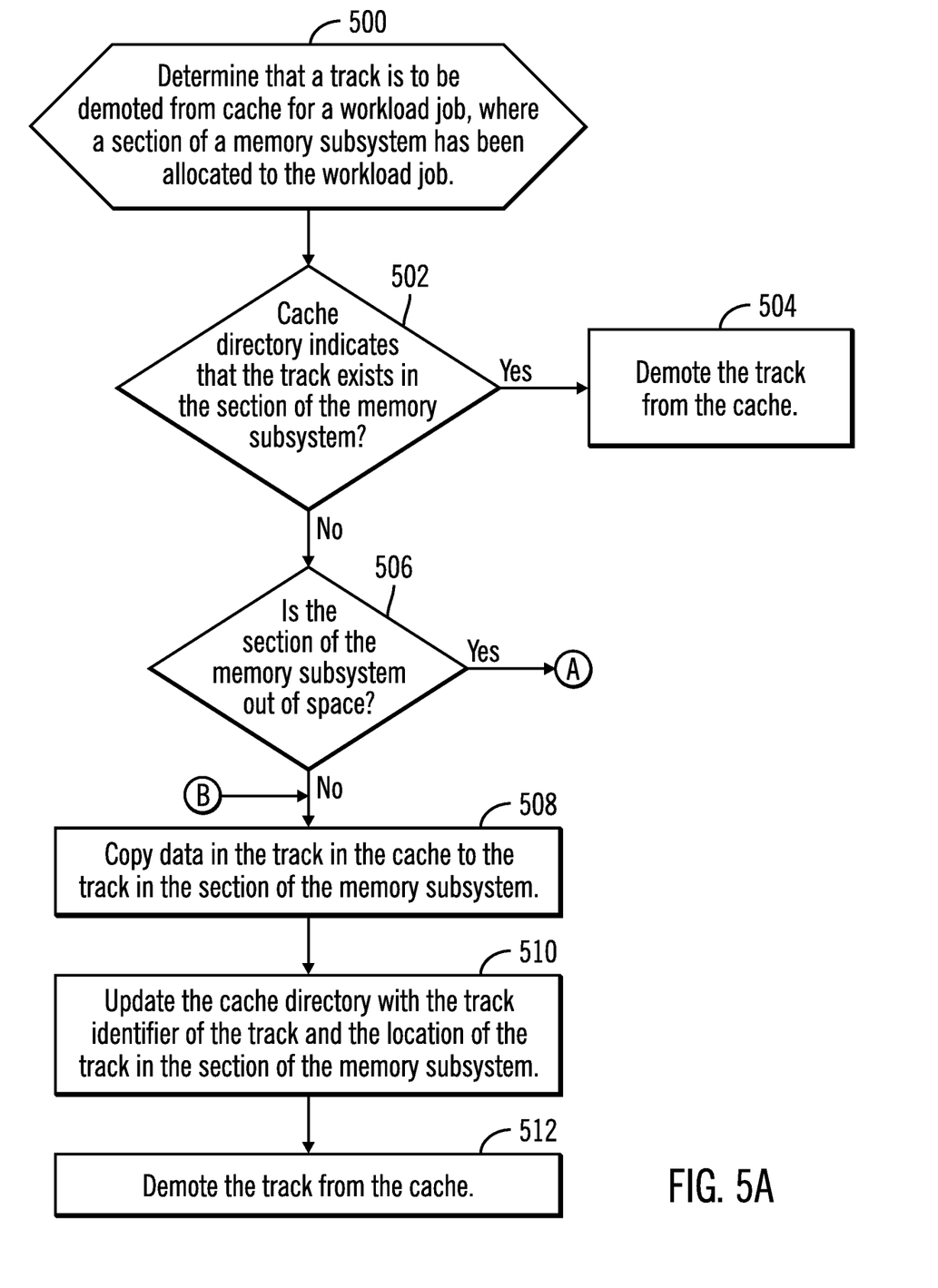
FIGS. 5A and 5B illustrate, in a flowchart, operations for demoting a track from cache in accordance with certain embodiments.
Figure 5B:
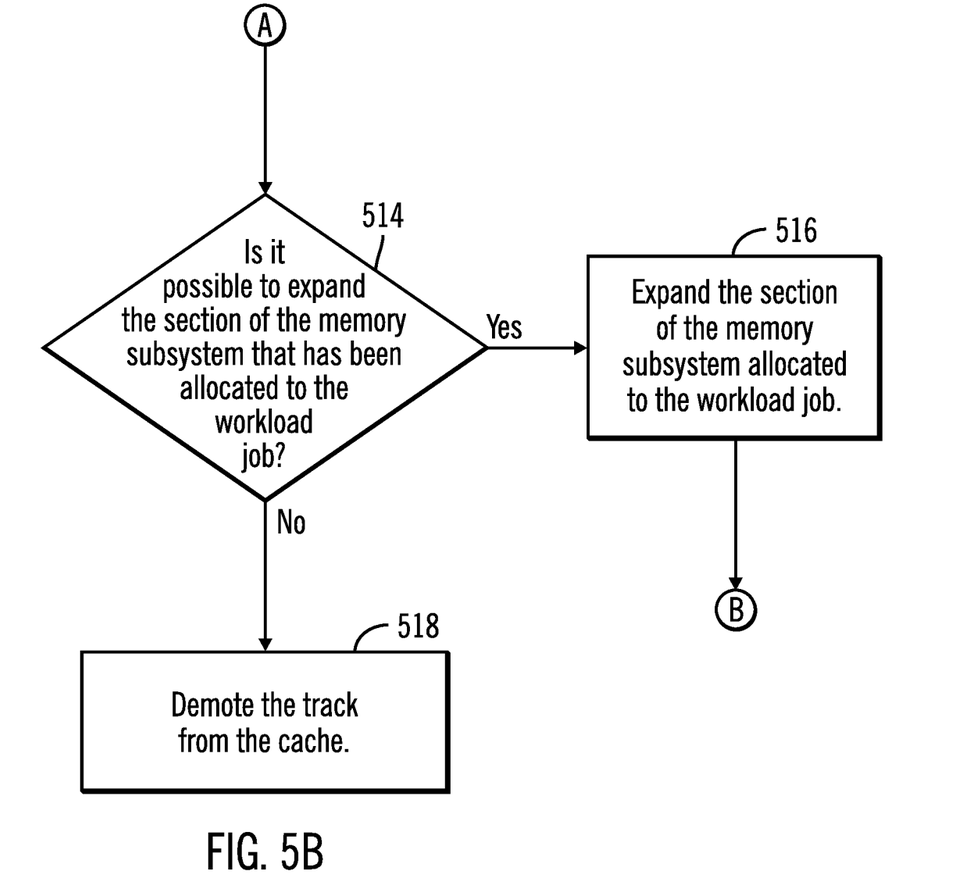

FIGS. 5A and 5B illustrate, in a flowchart, operations for demoting a track from the cache 140 in accordance with certain embodiments. A track that has not been modified may be demoted to make room in the cache 140. Control begins at block 500 with the storage manager 130 determining that a track is to be demoted from the cache 140 for a workload job, where a section of the memory subsystem 120 has been allocated to the workload job.

In block 502, the storage manager 130 determines whether the cache directory indicates that the track exists in the section of the memory subsystem 120. If so, processing continues to block 504, otherwise, processing continues to block 506.

In block 504, the storage manager 130 demotes the track from the cache 140.

In block 506, the storage manager 130 determines whether the section of the memory subsystem 120 is out of space. If so, processing continues to block 514 (FIG. 5B), otherwise, processing continues to block 508.

In block 508, the storage manager 130 copies data in the track in the cache 140 to the track in the section of the memory subsystem 120. The track in the cache 140 corresponds to the track in the section of the memory subsystem 120. In block 510, the storage manager 130 updates the cache directory with the track identifier of the track and the location of the track in the section of the memory subsystem 120. In block 512, the storage manager 130 demotes the track from the cache 140.

In block 514, the storage manager 130 determines whether it is possible to expand the section of the memory subsystem 120 that has been allocated to the workload job. If so, processing continues to block 516, otherwise, processing continues to block 518.

In block 516, the storage manager 130 expands the section of the memory subsystem 120 allocated to the workload job. From block 516 (FIG. 5B), processing continues to block 508 (FIG. 5A).

In block 518, the storage manager 130 demotes the track from the cache 140 to storage 110.

Thus, in certain embodiments, when a track is being demoted from the cache 140, if the track exists in the section of the memory subsystem 120, then the track is demoted from the cache 140. If the section of the memory subsystem 120 is out of space, then the section of the memory subsystem 120 is expanded, if possible. If the section is out of space and cannot be expanded, then the track is demoted from the cache 140. Otherwise, if there is space in the section of the memory subsystem 120 to store another track, then the track is copied to the section of the memory subsystem 120, the cache directory is updated for the section of the memory subsystem 120, and the track is demoted from the cache 140.

Figure 6:
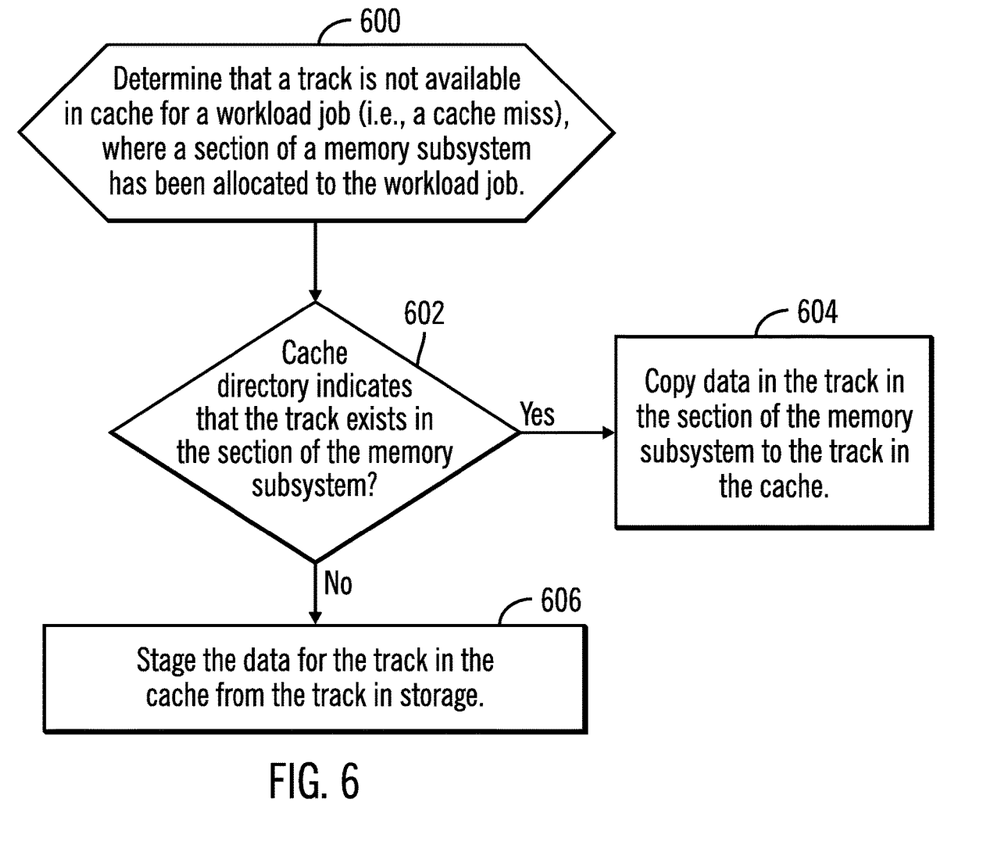
FIG. 6 illustrates, in a flowchart, operations for a cache miss in accordance with certain embodiments.

FIG. 6 illustrates, in a flowchart, operations for a cache miss in accordance with certain embodiments. Control begins at block 600 with the storage manager 130 determining that a track is not available in the cache 140 for a workload job, where a section of the memory subsystem 120 has been allocated to the workload job.

In block 602, the storage manager 130 determines whether the cache directory indicates that the track exists in the section of the memory subsystem 120. If so, processing continues to block 604, otherwise, processing continues to block 606.

In block 604, the storage manager 130 copies the data in the track in the section of the memory subsystem 120 to the track in the cache 140. That is, data in the track in the section of the memory subsystem 120 overwrites the data in the corresponding track in the cache 140.

In block 606, the storage manager 130 stages the data for the track in the cache 140 from the track in storage 110. That is, data in the track in the storage 110 overwrites the data in the corresponding track in the cache 140.

Thus, with embodiments, on a cache miss, if the track is in the section of the memory subsystem 120, then, the track is copied from the section to the cache 140, otherwise, the track is staged from the storage 110.

Figure 7:
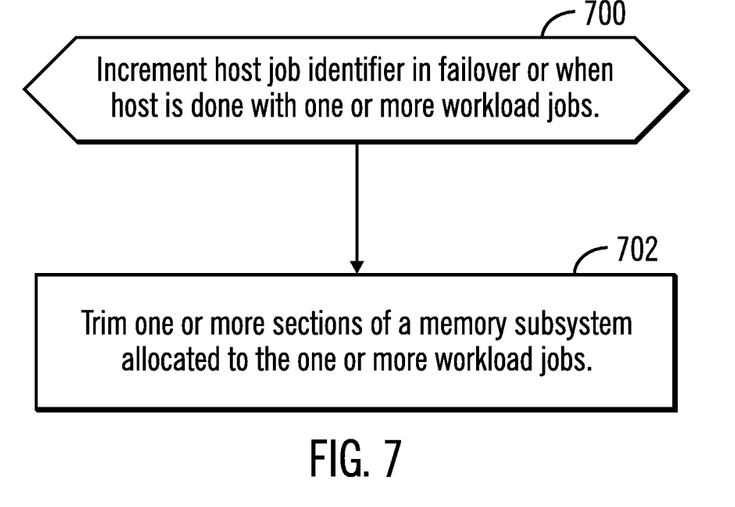
FIG. 7 illustrates, in a flowchart, operations for trim in accordance with certain embodiments.

FIG. 7 illustrates, in a flowchart, operations for trim in accordance with certain embodiments. Control begins at block 700 with the storage manager 130 incrementing a host job identifier in failover and/or determining that the host 102 is done with one or more workload jobs. In block 702, the storage manager 130 trims each section of the memory subsystem 120 allocated to the one or more workload jobs. Trimming a section of the memory subsystem 120 may be described as releasing that section for use by another workload job or other process.

Thus, with embodiments, the host job identifier may be incremented in failover or when the host 120 is done with a current batch of sort jobs. When the host job identifier is incremented do a trim on the section of the memory subsystem 120 for data, trim will release the memory used for the batch of the sort jobs.

In certain embodiments, the host 120 starts the batch of sort jobs at the same time and finishes them at the same time. This may be extended to sets of sort jobs. Thus, there can be many sets of sort jobs, and each set has its own section of the memory subsystem 120 and a separate host job identifier. Then, the processing of FIG. 7 is performed for each set of sort jobs.

In some cases, sequential writes may not use the memory subsystem 120 since sequential data is written once and then may not get accessed again, and so that data may be destaged to drives instead of caching it in the memory subsystem 120. However, in sort jobs, sequentially written data is accessed many times to do the sort, so it is useful to store the data in the memory subsystem 120. Therefore, in such a case, caching in the memory subsystem 120 makes sense. Also, sequentially written data causes very little fragmentation so the memory subsystem 120 performance is good and wear leveling is low. The data in the memory subsystem 120 is discarded at the end of the workload job. Since Flash memory offers a trim function to quickly release all space allocated to the sort job, data in the memory subsystem 120 may be discarded very quickly when the sort job is complete.

Unlike the conventional systems that destage tracks onto the storage 110, embodiments are able to store the tracks in the memory subsystem 120, which provides faster access than the storage 110.

Also, embodiments may be described as using a two-tiered cache memory comprising DRAM and SCM for workload jobs that perform numerous sequential write operations, with a separate cache directory for the tracks involved in the sort operations.

Embodiments handle situations when the segment of the memory subsystem 120 cache reaches a capacity threshold, when a track is to be demoted from the memory subsystem 120 into the storage, and when there is a cache miss (that results from a requested track not residing in the cache memory).

Figure 8:
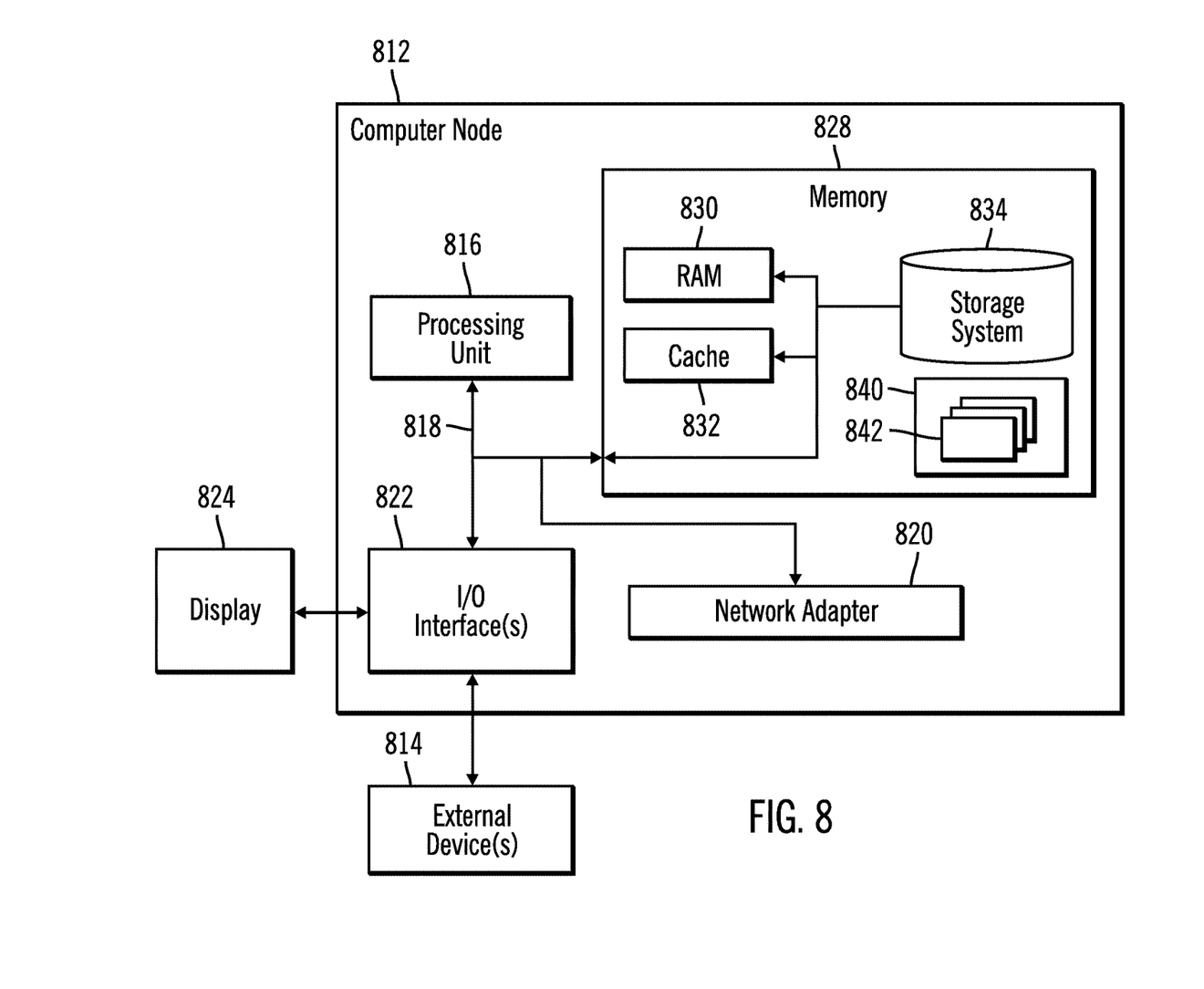
FIG. 8 illustrates, in a block diagram, a computer system in accordance with certain embodiments.

FIG. 8 illustrates, in a block diagram, a computer system in accordance with certain embodiments. In certain embodiments, the components of FIG. 1 may be implemented in such a computer system. Referring to FIG. 8, computer system 812 is only one example of a suitable computing system and is not intended to suggest any limitation as to the scope of use or functionality of embodiments of the invention described herein. Regardless, computer system 812 is capable of being implemented and/or performing any of the functionality set forth hereinabove.

The computational components of FIG. 1, including the hosts 102 and storage controller 104, may be implemented in one or more computer systems, such as the computer system 812 shown in FIG. 8.

The computer system 812 may be a computer system, which is operational with numerous other general purpose or special purpose computing system environments or configurations. Examples of well-known computing systems, environments, and/or configurations that may be suitable for use with computer system 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 812 may be described in the general context of computer system executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 812 typically includes a variety of computer system readable media. Such media may be any available media that is accessible by computer system 812, and it includes both volatile and non-volatile media, removable and non-removable media.

System memory 828 can include computer system readable media in the form of volatile memory, such as random access memory (RAM) 830 and/or cache memory 832. Computer system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components could be used in conjunction with computer system 812. Examples, include, but are not limited to: microcode, device drivers, redundant processing units, external disk drive arrays, RAID systems, tape drives, and data archival storage systems, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform:
    allocating a section of a memory subsystem to a workload job, wherein the memory subsystem is comprised of a plurality of heterogeneous memory devices;
    in response to a track being modified for the workload job in a cache, determining that modified tracks have reached a threshold portion of the cache; and
    in response to the determination that the modified tracks have reached the threshold portion of the cache,
        in response to determining that the track exists in the section of the memory subsystem using a cache directory, overwriting data in the track in the section of the memory subsystem with data in the track in the cache; and
        in response to determining that the track does not exist in the section of the memory subsystem using the cache directory,
            copying the data in the track in the cache to the track in the section of the memory subsystem;
            updating the cache directory with a location of the track in the section of the memory subsystem; and
            demoting the track from the cache to storage.

2. The computer program product of claim 1, wherein the program code is executable by the at least one processor to further perform:
    creating the cache directory for the section of the memory subsystem, wherein the cache directory indicates whether a particular track is stored in the section of the memory subsystem.

3. The computer program product of claim 1, wherein the program code is executable by the at least one processor to further perform:
    expanding the section of the memory subsystem allocated to the workload job.

4. The computer program product of claim 1, wherein the program code is executable by the at least one processor to further perform:
    determining that another track is to be demoted from the cache;
    in response to determining that the track exists in the section of the memory subsystem, demoting the track from the cache; and
    in response to determining that the track does not exist in the section of the memory subsystem,
        copying the track to the section of the memory subsystem; and
        demoting the track from the cache.

5. The computer program product of claim 1, wherein the program code is executable by the at least one processor to further perform:
    determining that a cache miss has occurred for the track;
    in response to determining that the track exists in the section of the memory subsystem, copying the data in the track in the section of the memory subsystem to the track in the cache; and
    in response to determining that the track does not exist in the section of the memory subsystem, staging the data for the track from a track in the storage.

6. The computer program product of claim 1, wherein the program code is executable by the at least one processor to further perform:
    in response to one of a cache fast write identifier being incremented and the workload job completing, trimming the section of the memory subsystem allocated to the workload job.

7. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations, the operations comprising:
    allocating a section of a memory subsystem to a workload job, wherein the memory subsystem is comprised of a plurality of heterogeneous memory devices;
    in response to a track being modified for the workload job in a cache, determining that modified tracks have reached a threshold portion of the cache; and
    in response to the determination that the modified tracks have reached the threshold portion of the cache,
        in response to determining that the track exists in the section of the memory subsystem using a cache directory, overwriting data in the track in the section of the memory subsystem with data in the track in the cache; and
        in response to determining that the track does not exist in the section of the memory subsystem using the cache directory,
            copying the data in the track in the cache to the track in the section of the memory subsystem;
            updating the cache directory with a location of the track in the section of the memory subsystem; and
            demoting the track from the cache to storage.

8. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:
    creating the cache directory for the section of the memory subsystem, wherein the cache directory indicates whether a particular track is stored in the section of the memory subsystem.

9. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:
 expanding the section of the memory subsystem allocated to the workload job.

10. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:
 determining that another track is to be demoted from the cache;
 in response to determining that the track exists in the section of the memory subsystem, demoting the track from the cache; and
 in response to determining that the track does not exist in the section of the memory subsystem,
  copying the track to the section of the memory subsystem; and
  demoting the track from the cache.

11. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:
 determining that a cache miss has occurred for the track;
 in response to determining that the track exists in the section of the memory subsystem, copying the data in the track in the section of the memory subsystem to the track in the cache; and
 in response to determining that the track does not exist in the section of the memory subsystem, staging the data for the track from a track in the storage.

12. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:
 in response to one of a cache fast write identifier being incremented and the workload job completing, trimming the section of the memory subsystem allocated to the workload job.

13. A computer-implemented method, comprising:
 allocating a section of a memory subsystem to a workload job, wherein the memory subsystem is comprised of a plurality of heterogeneous memory devices;
 in response to a track being modified for the workload job in a cache, determining that modified tracks have reached a threshold portion of the cache; and
 in response to the determination that the modified tracks have reached the threshold portion of the cache,
  in response to determining that the track exists in the section of the memory subsystem using a cache directory, overwriting data in the track in the section of the memory subsystem with data in the track in the cache; and
  in response to determining that the track does not exist in the section of the memory subsystem using the cache directory,
   copying the data in the track in the cache to the track in the section of the memory subsystem;
   updating the cache directory with a location of the track in the section of the memory subsystem; and
   demoting the track from the cache to storage.

14. The computer-implemented method of claim 13, further comprising:
 creating the cache directory for the section of the memory subsystem, wherein the cache directory indicates whether a particular track is stored in the section of the memory subsystem.

15. The computer-implemented method of claim 13, further comprising:
 expanding the section of the memory subsystem allocated to the workload job.

16. The computer-implemented method of claim 13, further comprising:
 determining that another track is to be demoted from the cache;
 in response to determining that the track exists in the section of the memory subsystem, demoting the track from the cache; and
 in response to determining that the track does not exist in the section of the memory subsystem,
  copying the track to the section of the memory subsystem; and
  demoting the track from the cache.

17. The computer-implemented method of claim 13, further comprising:
 determining that a cache miss has occurred for the track;
 in response to determining that the track exists in the section of the memory subsystem, copying the data in the track in the section of the memory subsystem to the track in the cache; and
 in response to determining that the track does not exist in the section of the memory subsystem, staging the data for the track from a track in the storage.

18. The computer-implemented method of claim 13, further comprising:
 in response to one of a cache fast write identifier being incremented and the workload job completing, trimming the section of the memory subsystem allocated to the workload job.

\* \* \* \* \*